(12) United States Patent
Marras et al.

(10) Patent No.: US 11,549,723 B2
(45) Date of Patent: Jan. 10, 2023

(54) METHOD FOR APPLYING AN UPPER TRANSPARENT PROTECTIVE COATING LAYER TO A REFLECTING STRATIFORM STRUCTURE

(71) Applicant: Coveme S.P.A., Gorizia (IT)

(72) Inventors: Luigi Marras, Gorizia (IT); Matteo Racchi, Gorizia (IT); Daniela Concas, Gorizia (IT)

(73) Assignee: COVEME S.P.A., Gorizia (IT)

(*) Notice: Subject to any disclaimer, the term of this patent is extended or adjusted under 35 U.S.C. 154(b) by 203 days.

(21) Appl. No.: 16/975,131

(22) PCT Filed: Feb. 22, 2019

(86) PCT No.: PCT/IB2019/051448
§ 371 (c)(1),
(2) Date: Aug. 23, 2020

(87) PCT Pub. No.: WO2019/166927
PCT Pub. Date: Sep. 6, 2019

(65) Prior Publication Data
US 2021/0088257 A1     Mar. 25, 2021

(30) Foreign Application Priority Data
Feb. 27, 2018   (IT) .................. 102018000003096

(51) Int. Cl.
*G02B 1/14*     (2015.01)
*F24S 23/70*    (2018.01)
(Continued)

(52) U.S. Cl.
CPC .............. *F24S 23/82* (2018.05); *B32B 7/06* (2013.01); *B32B 7/12* (2013.01); *B32B 15/09* (2013.01);
(Continued)

(58) Field of Classification Search
CPC ............ B32B 2457/12; B32B 2405/00; B32B 2307/416; B32B 2307/412;
(Continued)

(56) References Cited

U.S. PATENT DOCUMENTS

| 2011/0199685 A1 | 8/2011 | Ito ................................. 359/589 |
| 2014/0251313 A1 | 9/2014 | Jorgensen et al. ... G02B 5/0808 |

(Continued)

FOREIGN PATENT DOCUMENTS

| CN | 102193124 | 9/2011 |
| CN | 104245608 | 12/2014 |

(Continued)

OTHER PUBLICATIONS

International Search Report dated May 10, 2019 in corresponding PCT application No. PCT/IB2019/051448, 3 pages.

*Primary Examiner* — Vishal I Patel
(74) *Attorney, Agent, or Firm* — Fattibene and Fattibene LLC; Paul A. Fattibene (57) ABSTRACT

The present invention refers to a method for making a reflecting stratiform structure (100), configured so as to reflect the incident radiation coming from an upper side with respect to the reflecting stratiform structure (100), comprising an upper transparent protective coating layer (101) configured in that the upper transparent protective coating layer (101) is applied to the reflecting stratiform structure (100) through a cross-linking process, which is carried out by cross-linking a polymerisable resin, which will form the upper transparent protective coating layer (101), making energy pass through a transparent thermoplastic film (102, 120), preferably made of polyethylene terephthalate (PET), so as to cross-link the polymerisable resin.

14 Claims, 3 Drawing Sheets

(51) Int. Cl.

| | | |
|---|---|---|
| *F24S 23/77* | (2018.01) | |
| *B32B 7/06* | (2019.01) | |
| *B32B 7/12* | (2006.01) | |
| *B32B 15/09* | (2006.01) | |
| *B32B 15/20* | (2006.01) | |
| *B32B 27/08* | (2006.01) | |
| *B32B 27/36* | (2006.01) | |
| *B32B 37/10* | (2006.01) | |
| *B32B 38/00* | (2006.01) | |
| *B32B 38/10* | (2006.01) | |
| *G02B 5/08* | (2006.01) | |

(52) U.S. Cl.
CPC .............. *B32B 15/20* (2013.01); *B32B 27/08* (2013.01); *B32B 27/36* (2013.01); *B32B 37/10* (2013.01); *B32B 38/00* (2013.01); *B32B 38/10* (2013.01); *F24S 23/77* (2018.05); *G02B 1/14* (2015.01); *G02B 5/0808* (2013.01); *B32B 2038/0076* (2013.01); *B32B 2255/26* (2013.01); *B32B 2307/412* (2013.01); *B32B 2307/416* (2013.01); *B32B 2405/00* (2013.01); *B32B 2457/12* (2013.01); *F24S 2023/86* (2018.05)

(58) Field of Classification Search
CPC ........ B32B 2255/26; B32B 2038/0076; B32B 38/10; B32B 38/00; B32B 37/10; B32B 27/36; B32B 27/08; B32B 15/20; B32B 15/09; B32B 7/12; B32B 7/06; F24S 2023/86; F24S 23/77; G02B 5/0808
See application file for complete search history.

(56) References Cited

U.S. PATENT DOCUMENTS

| | | | |
|---|---|---|---|
| 2014/0357012 A1 | 12/2014 | Toriyama et al. | |
| 2015/0225994 A1 | 8/2015 | Kostro et al. | |
| 2017/0115437 A1* | 4/2017 | Ito | B32B 27/08 |

FOREIGN PATENT DOCUMENTS

| | | |
|---|---|---|
| CN | 104608370 | 5/2015 |
| CN | 105164914 | 12/2015 |
| EP | 2882921 | 6/2015 |
| JP | H08112866 | 5/1996 |
| JP | 2016053742 | 4/2016 |
| JP | 6283041 | 2/2018 |

* cited by examiner

METHOD FOR APPLYING AN UPPER TRANSPARENT PROTECTIVE COATING LAYER TO A REFLECTING STRATIFORM STRUCTURE

TECHNICAL FIELD

The present invention concerns the field of the reflection of solar radiation. In particular, the present invention concerns a method for making a reflecting stratiform structure configured so as to reflect the incident radiation coming from the upper side with respect to the structure, wherein the structure comprises an upper transparent protective coating layer.

BACKGROUND

Currently, in order to have more sustainable development, there is a great need to exploit solar radiation in the best possible way to produce electrical energy. However, at the same time it is clear that the concentration of solar energy is relatively low and therefore the concentration of incident radiation in many cases becomes necessary. An example is that of the use of parabolic mirrors adapted to concentrate the incident radiation on them towards a solar collector positioned in the focus of the parabola. Another example is that provided by the solar mirrors used in a photovoltaic system to allow the incident radiation between two adjacent rows of photovoltaic panels, which would otherwise be dispersed, to be reflected onto them through mirrors.

In the same way, there is currently a need to have reflective structures that are cost-effective, efficient and long-lasting. Indeed, with regard to cost-effectiveness, it is clear that a fundamental problem is that of a reduction of the production costs to obtain systems that are competitive with other energy sources. Moreover, with regard to efficiency and lifetime, it is clear that, while on the one hand it is necessary for such structures to withstand bad weather, humidity and big temperature changes over a long time period, thus requiring a very resistant covering layer, on the other hand it is necessary for such structures comprising such a covering layer to be very transparent to allow the incident radiation to reach the reflective layer and thus be reflected as much as possible. Moreover, in order to provide high transparency, it is necessary for the upper coating surface of such mirrors to have a predetermined shape that can preferably be either perfectly smooth or having a predetermined surface pattern so as to capture the most incident radiation possible.

However, it is very difficult to obtain perfectly smooth coating layers since, due to the machining process, slightly rough surfaces are formed and it is therefore difficult to achieve predetermined roughness levels.

The present invention thus has the purpose of providing a method for making a reflecting stratiform structure configured so as to reflect the incident radiation coming from the upper side with respect to the structure which at the same time is cost-effective, with a high degree of reflectivity and strong. In addition, the present invention also has the aim of providing an upper transparent protective coating layer having an upper surface that has a predetermined shape that can be of any type: from being perfectly smooth to having a predetermined pattern. In particular, the present invention refers to an efficient method for applying the upper transparent protective coating layer to the reflecting stratiform structure.

SUMMARY

The present invention is based on the idea of providing the upper transparent protective coating layer inside the reflecting stratiform structure through a cross-linking process, wherein such a process is carried out through a transparent thermoplastic film, like for example PET.

In the present invention, the terms "above", "below", "lower", "upper", "top", "bottom", "front" and "rear", unless otherwise specified, refer to the relative arrangement of the various layers considering a section view of the final architecture of the structure in which the surface facing towards the sun occupies the highest level.

According to an embodiment of the present invention a method for making a reflecting stratiform structure is provided that is configured so as to reflect the incident radiation coming from an upper side with respect to the structure, comprising an upper transparent protective coating layer characterised in that the upper transparent protective coating layer is applied to the reflecting stratiform structure through a cross-linking process, which is done by cross-linking a polymerisable resin, which will form the upper transparent protective coating layer, letting energy pass through a transparent thermoplastic film, preferably made of polyethylene terephthalate (PET), so as to cross-link the polymerisable resin. This means that the cross-linking process is carried out by letting the energy necessary to carry out such a process pass through the transparent thermoplastic film. Such energy can be in any form: from simple heat to an electron beam. This solution is particularly advantageous since it makes it possible to carry out the cross-linking process through a transparent surface, such as PET. Therefore, the characteristics of the surface of the transparent thermoplastic film can for example also be replicated on the upper transparent protective coating layer. This means that it is possible to obtain an upper transparent protective coating layer having the same surface features as the transparent thermoplastic film used to carry out the cross-linking process. For example, if it is wished to obtain a perfectly smooth upper transparent protective coating layer, it is possible to use a perfectly smooth transparent thermoplastic film. The same is valid in the case in which it is wished to obtain an upper transparent protective coating layer having a predetermined surface pattern. On the other hand, in the case in which a transparent thermoplastic film is not used to carry out such a cross-linking process, there would be the risk of having a rough and not sufficiently smooth surface, as is required on the other hand for most cases in reflecting mirrors.

According to a further embodiment of the present invention a method is provided in which the cross-linking process is carried out through electron beam machining or ultraviolet machining. This solution is particularly advantageous since it makes it possible to carry out the cross-linking process avoiding overheating the transparent thermoplastic film through which such a cross-linking process is carried out.

According to a further embodiment of the present invention a method is provided in which the polymerisable resin that will form the upper transparent protective coating layer is applied directly on a transparent thermoplastic film, preferably made of polyethylene terephthalate (PET). This solution is particularly advantageous since it makes it possible in many cases to use the transparent thermoplastic film used for the cross-linking process also to apply the upper transparent protective coating layer. Therefore, it will thus be possible to use the underlying transparent thermoplastic film to carry out the cross-linking process and/or to use the transparent thermoplastic film to copy the characteristics of the surface of the underlying transparent thermoplastic film.

According to a further embodiment of the present invention a method is provided in which the method comprises the following steps:
a. providing a lower support structure of the reflecting stratiform structure on which to apply the upper transparent protective coating layer;
b. applying the polymerisable resin on the lower support structure.

According to a further embodiment of the present invention a method is provided further comprising the following steps:
c. applying a removable transparent thermoplastic film, preferably made of polyethylene terephthalate (PET), on the polymerisable resin;
d. cross-linking the polymerisable resin through the removable transparent thermoplastic film, making energy pass through the removable transparent thermoplastic film, so as to solidify the polymerisable resin forming the upper transparent protective coating layer;
e. Withdrawing the removable transparent thermoplastic film from the upper transparent protective coating layer.

This solution is particularly advantageous since it makes it possible to use the removable transparent thermoplastic film to carry out the cross-linking process. This means that, by applying such a removable transparent thermoplastic film, it is possible to replicate, whatever it is, the surface pattern of the removable transparent thermoplastic film. Moreover, in the case in which it is wished to change the surface pattern of the upper transparent protective coating layer, it will suffice to simply replace the removable transparent thermoplastic film. Alternatively, in the case in which it is wished to have a perfectly smooth surface, a perfectly smooth removable transparent thermoplastic film will preferably be used. Moreover, being able to withdraw the removable transparent thermoplastic film makes it possible to reuse such a layer another time, for example for successive cross-linking processes.

According to a further embodiment of the present invention a method is provided in which steps (c) and (e) are carried out through a "roll to roll" process. Such a solution is particularly advantageous since it makes it possible to effectively speed up the production process of the reflecting stratiform structure and in particular the speed of the cross-linking process. Moreover, the fact that the transparent thermoplastic film is rolled up after the cross-linking process has been carried out through it, makes it possible to reuse such a layer even subsequently for further cross-linking processes.

According to a further embodiment of the present invention a method is provided in which the lower support structure is a transparent thermoplastic film, preferably made of polyethylene terephthalate (PET), wherein the method further comprises the following steps:
f. applying a pressure directly on the polymerisable resin;
g. cross-linking the polymerisable resin through the lower support structure, making energy pass through such a lower support structure, so as to solidify the polymerisable resin forming the upper transparent protective coating layer.

This solution is particularly advantageous since it makes it possible to carry out the cross-linking process through a transparent thermoplastic film in which the transparent thermoplastic film is the same one that separates the upper transparent protective coating layer and the reflective layer, thus without the need to have to add an outer layer. Moreover, thanks to the fact that the pressure is applied directly on the polymerisable resin, it will be possible to modify and mould the polymerisable resin as desired, for example making a surface having predetermined surface features and to thus obtain an upper coating layer having predetermined characteristics.

According to a further embodiment of the present invention a method is provided in which step (f) is carried out by exerting a pressure through a rotatable drum. This solution is particularly advantageous since it makes it possible to apply a pressure on the transparent thermoplastic film so that the cross-linking process can be carried out efficiently. Indeed, exerting a pressure on the polymerisable resin makes it possible to effectively make the polymerisable resin adhere to the underlying transparent thermoplastic film. Moreover, the fact that a rotatable drum is used makes it possible to have an extremely fast production process since it can be carried out continuously through the continuous rotation of the rotatable drum. Moreover, thanks to the outer surface of the rotatable drum it is possible to provide the surface features that the upper transparent protective coating layer will have.

According to a further embodiment of the present invention a method is provided in which such a method is carried out through a "roll to roll" process. This solution is particularly advantageous since it makes it possible to have a continuous production process, without having to interrupt the single processes, such as to application of the polymerisable resin or of the cross-linking process.

BRIEF DESCRIPTION OF THE FIGURES

The present invention will be described with reference to the attached figures in which the same reference numerals and/or reference marks indicate the same parts and/or similar parts and/or corresponding parts of the system.

DETAILED DESCRIPTION

Hereinafter, the present invention is described with reference to particular embodiments, as illustrated in the attached tables of drawings. However, the present invention is not limited to the particular embodiments described in the following detailed description and represented in the figures, but rather the described embodiments simply exemplify the various aspects of the present invention, the purpose of which is defined by the claims. Further modifications and variations of the present invention will become clear to those skilled in the art.

In the present description, the term film is meant to indicate a layer of thin planar material that can be applied above a surface, preferably flat, and which has a preferably constant thickness along the plane on which it extends. Moreover, the term thermoplastic film is thus meant to indicate a layer of a substance that is thermoplastic and that thus has the property of reversibly acquiring plasticity, and thus mouldability, under the action of heat.

Figure 1:
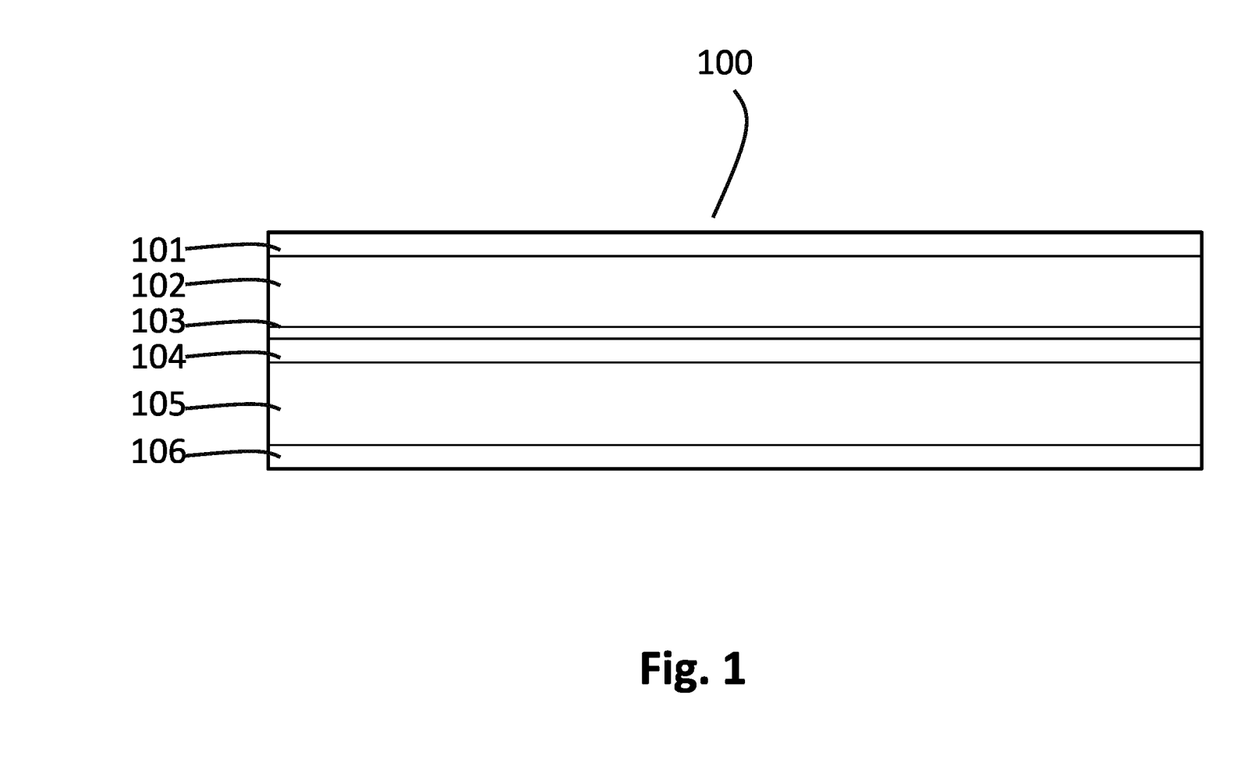
FIG. 1 schematically shows a section of a reflecting stratiform structure according to an embodiment of the present invention.

FIG. 1 schematically shows a reflecting stratiform structure 100 which makes it possible to reflect the incident radiation coming from an upper side with respect to such a structure 100. Hereinafter, the various layers comprised in such a stratiform structure 100 will be described. However, it should be emphasised that it is clear to those skilled in the art that some layers can be omitted or other layers can be added without departing from the scope of the invention which is defined by the attached claims.

In the particular example represented in FIG. 1, a transparent thermoplastic film 102 is positioned above and in direct contact with a reflective layer 103 so as to protect the reflective layer 103 beneath. Indeed, it is important to have insulation between the reflective layer and the outside so that the external agents, like for example humidity, do not deteriorate the reflective layer 103.

Such a transparent thermoplastic film described above, used in such a transparent thermoplastic film 102, can for example be a layer of PET having a thickness for example comprised between 50 μm and 100 μm, wherein such a thickness is preferably equal to 75 μm. However, alternatively to such a transparent thermoplastic film 102 it is possible to use a fluorinated film like for example FEP, PVDF or PVF. Another possibility is that of using an acrylate film, like for example PMMA, which is particularly advantageous for the transparency, chemical resistance and mechanical characteristics thereof, and for the surface planarity thereof.

The reflective layer 103 is preferably a metallic layer of aluminium or a metallic layer of silver. Such a reflective layer 103 has the purpose of reflecting the greatest possible amount of incident light. Therefore, thanks to the metallic layer made for example of silver or aluminium, even more than 94% of the incident light can be reflected, in the case in which it is silver. Such a reflective layer 103 has a very thin thickness for example equal to 0.1 μm.

Therefore, the incident solar radiation on such a reflecting stratiform structure 100 can penetrate through such a transparent thermoplastic film 102, be reflected by the reflective layer 103 and come back out from such a structure passing again through such a transparent thermoplastic film 102.

A transparent protective upper coating layer 101 is positioned above the layer 102 that makes it possible to provide more protection to the reflective layer 103. Such a transparent protective upper coating layer 101 can have either a perfectly smooth surface or a pattern to be able to better interact with light. However, it is important that such a transparent protective upper coating layer 101 has a high transmission coefficient so as to allow the greatest amount of incident radiation possible to be transmitted through it. Such an upper transparent protective coating layer 101 can have a thickness comprised between 4 μm and 50 μm but preferably it is 15 μm.

Below the reflective layer 103, in the particular example represented in the figures, a second thermoplastic film 105 is positioned which is applied to the reflective layer 103 through a layer of adhesive 104 thus positioned between the reflective layer 103 and the second thermoplastic film 105. As far as the thicknesses are concerned, the second thermoplastic film 105 can have a thickness comprised between 75 μm and 350 μm and preferably it is equal to 150 μm. Such a thickness will however depend greatly on the application inside which such a reflecting stratiform structure 100 is applied. For example, in the case in which it is wished to have a self-supporting structure, it will be preferable to have a very high thickness of such a layer 105, for example equal to 350 μm. On the other hand, in the case in which the reflecting stratiform structure 100 is subsequently applied to a support layer, the layer 105 can also have a much smaller thickness, for example equal to 75 μm. The layer of adhesive 104 that makes it possible to fix the layer 105 to the reflective layer 103 can have a thickness comprised between 6 μm and 12 μm, preferably equal to 8 μm.

Such a thermoplastic film used in the second thermoplastic film 105 can, also in this case, be represented by PET, even if in this case it is not necessary for it to be a transparent material since, being located at the rear with respect to the reflective layer, it clearly does not perform the task of reflecting the incident light as on the other hand occurs for the first thermoplastic film 102 described earlier.

Therefore, due to what has been described, the reflective layer 103 will be positioned between two layers of thermoplastic film, such as PET, which thus make it possible to "sandwich" the reflective layer protecting it from external agents. Moreover, the upper transparent protective coating layer 101 makes it possible to effectively protect the lower layers from scratches and from external agents, which could otherwise greatly influence the behaviour of the reflecting stratiform structure. Indeed, it is clear that the upper transparent protective coating layer 101, which is in direct contact with the outside, has the protective function of the underlying layers and, in the same way, thanks to the chemical and physical properties thereof, allows it to be particularly resistant to external agents so as to be able to prevent possible accidental alterations of the upper transparent protective coating layer 101.

Moreover, as stated, the upper transparent protective coating layer 101 can have different shapes. In the case in which it has a perfectly smooth surface, it is possible to have a coating layer that allows the incident light coming from any direction to pass undisturbed through such a layer. On the other hand, in the case in which the surface has a predetermined surface pattern, it is possible for example to modify the direction of the incident radiation ensuring that, irrespective of the direction from which it comes, it can reach the underlying layer (the first thermoplastic film 102) with a direction perpendicular to the first thermoplastic film 102 or, more generally, with a predetermined direction.

The upper transparent protective coating layer 101 can also act as protection against ultraviolet rays. In this way, both the first thermoplastic film 102 and the reflective layer 103 can be effectively protected from ultraviolet radiation incident on the reflecting stratiform structure 100.

Below such a second thermoplastic film 105, in the case in which it is wished to apply the reflecting stratiform structure 100 to an outer body, it is possible to install a pressure-sensitive adhesive layer 106 in direct contact with the second thermoplastic film 105. In this way, by applying a simple pressure on such a stratiform structure, it will be possible to apply the structure 100 to an outer support. It is clear that, below such a pressure-sensitive adhesive layer 106, it is possible to apply a tear-away coating (not depicted) that can be removed before the application of the reflecting stratiform structure 100 to an outer element.

Alternatively, the lower side of the second thermoplastic film 105 can be made so that such a surface is weldable, for example thermoweldable. Indeed, in the state of the art there are known amorphous surfaces applicable to stratiform structures, like the one described here, which make it possible to apply the structure itself to an outer body through hot welding.

The reflecting stratiform structure 100 described above can be supplied in reels of great length, also equal for example to 1000 m of length. For example, a reel can have a length of the order of 1000 m and a width of the order of 1.5 m.

Hereinafter, a production method of a reflecting stratiform structure 100, and in particular an application method of the upper transparent protective coating layer 101, according to a particular embodiment of the present invention is described.

Figure 2:
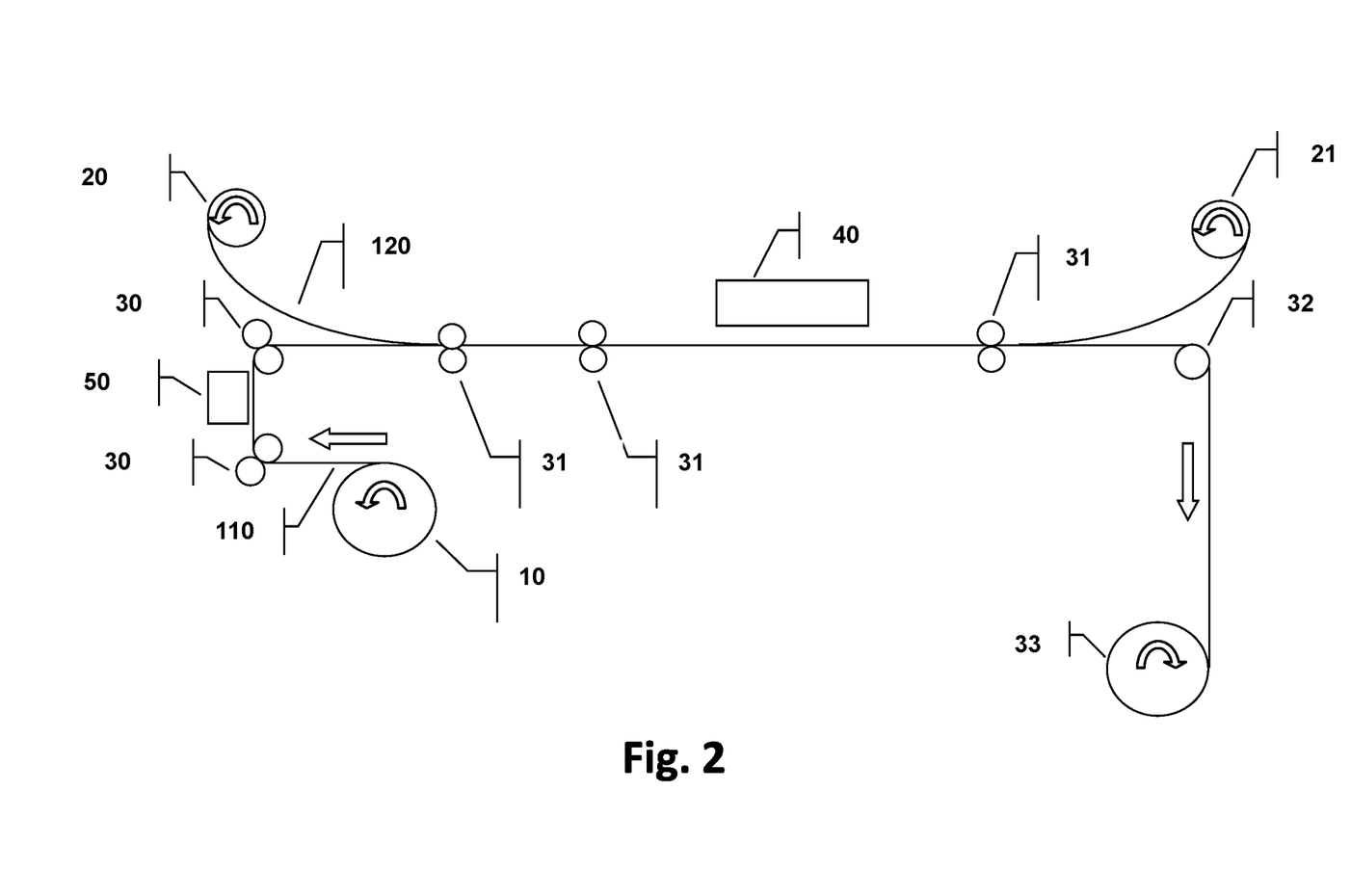
FIG. 2 schematically shows an application method of an upper transparent protective coating layer on a reflecting stratiform structure according to an embodiment of the present invention.
Figure 3:
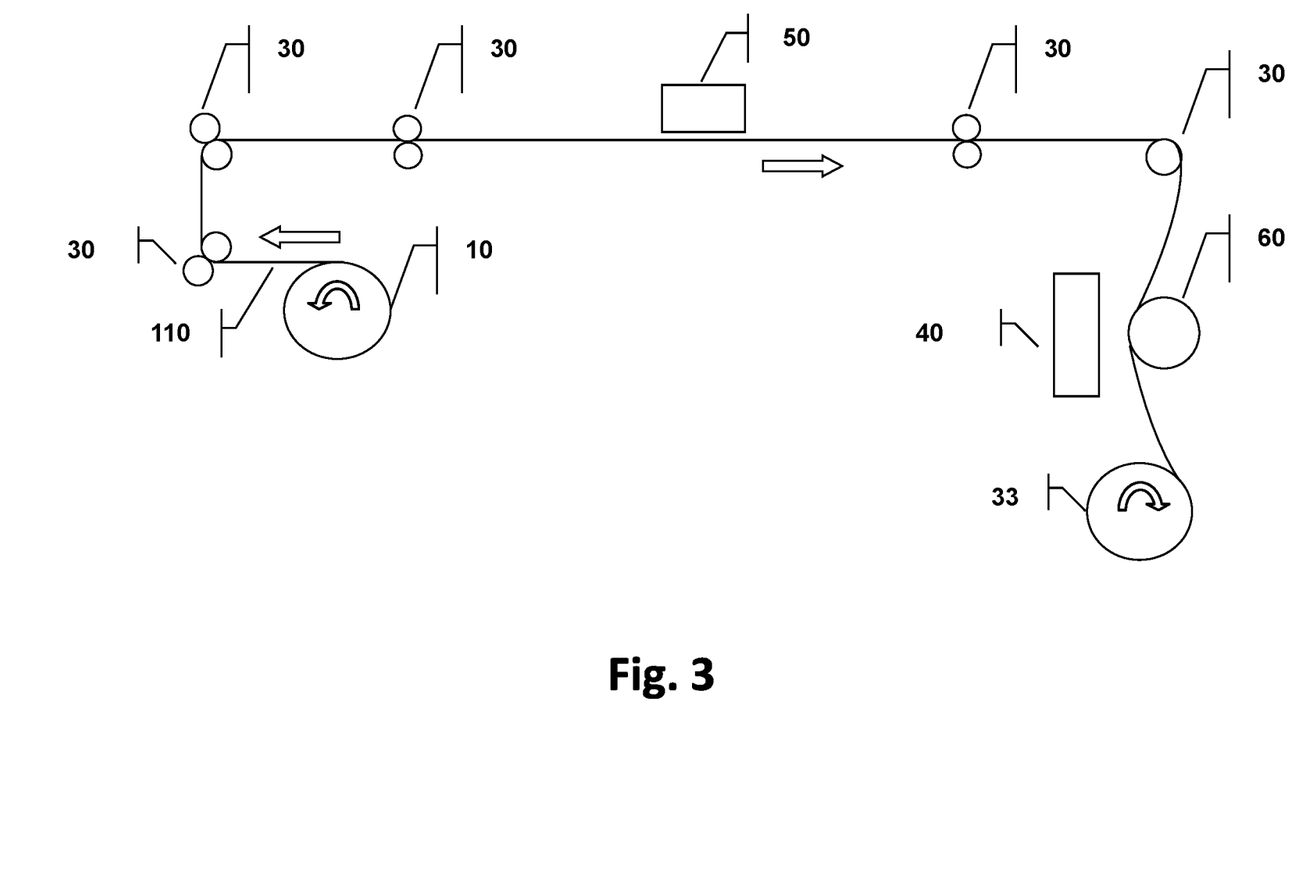
FIG. 3 schematically shows an application method of an upper transparent protective coating layer on a reflecting stratiform structure according to a further embodiment of the present invention.

FIGS. 2 and 3 present two alternative methods for applying the upper transparent protective coating layer 101 in the reflecting stratiform structure 100. As will be clearer at the end of the description, the two different methods, although apparently different, share the same inventive concept. In particular, in both of the methods the cross-linking process is carried out by cross-linking a polymerisable resin through a transparent thermoplastic film. This means that in both methods the energy necessary to carry out the cross-linking process is made to pass through a transparent thermoplastic film.

With reference to FIG. 2, the first of the two methods able to be used to apply the upper transparent protective coating layer 101 to the reflecting structure 100 will be described hereinafter.

As shown in the figures, a lower support structure 110 is made to unroll along the direction shown by the arrow in the figures from a reel 10 on which such a structure is rolled. The lower support structure 110 can be made up of one or more layers arranged one on top of the other. In the case for example in which there is a single layer, it will be the first thermoplastic film 102 described earlier, on the other hand in the case in which for example there are two layers there will preferably be the first thermoplastic film 102 and the reflective layer 103 arranged below it. It is clear that the method described here can be applied to any lower support structure 110 thus having any number of layers.

As stated, the lower support structure 110 is unrolled and taken through rollers 30 towards an area in which an element is positioned for the application of polymerisable resin 50 which makes it possible to apply a polymerisable resin on the side of the lower support structure 110 on which the first thermoplastic film 102 is positioned. Examples of such an element 50 are for example the elements commonly used in "flexo or roll-coating" technology or even for "gravure coating" technology, as well as other technologies known in the state of the art.

Hereinafter, the lower support structure 110, on the upper surface of which the layer of polymerisable resin has been spread, is driven towards an area in which there is one or more pairs of rotating rollers 31 configured so as to be able to apply a removable transparent thermoplastic film 120 on the lower support structure 110 so that such a removable transparent thermoplastic film 120 directly contacts the polymerisable resin. In this way, the polymerisable resin is enclosed between two layers: an upper layer that is the removable transparent thermoplastic film 120 and a lower layer that is the first thermoplastic film 102. The removable transparent thermoplastic film 120 can have a thickness comprised between 12 µm and 125 µm, preferably equal to 50 µm.

As can be seen in the figures, the stratiform structure that is formed is driven towards an area in which there are polymerisation means 40, which for example make it possible to emit an electron beam or ultraviolet rays so as to cross-link the polymerisable resin passing through the upper layer that is represented by the removable transparent thermoplastic film 120.

After such machining has taken place, i.e. after the layer of polymerisable resin, for example of acrylic resin, has reached a solid phase forming the upper transparent protective coating layer 101, the structure that has been formed, thus made up of the lower support structure 110, the upper transparent protective coating layer 101 and the removable transparent thermoplastic film 120, is made to proceed through rotating rollers 31 up to a point in which the removable transparent thermoplastic film 120 is withdrawn thus separating the removable transparent thermoplastic film 120 from the underlying structure comprising at least two layers, i.e. at least the upper transparent protective coating layer 101 and the first transparent thermoplastic film 102, and then to roller 32. However, it is clear that if the lower support structure 110 initially comprised more than one layer, the final number of layers will be more than two.

There are some provisions that can be used to allow easy removal of the removable transparent thermoplastic film 120 from the upper transparent protective coating layer 101 after the cross-linking process has been made. In particular, one of these provisions corresponds to treating the lower surface of the removable transparent thermoplastic film 120 so as to provide a detaching effect to such a layer. Such treatment can be carried out by coating the aforementioned lower surface of the removable transparent thermoplastic film 120 with detaching coatings having a very low thickness, for example comprised between 0.1 µm and 1 µm. Such coatings can belong to the category of coatings having hydrophobic character, mainly wax, silicone or stearate-based. As can be seen in the figures, the application process of the removable transparent thermoplastic film 120 to the support structure 110 takes place through a "roll to roll" process in which the removable transparent thermoplastic film 120 is unrolled from a first roller 20 and driven towards a second roller 21 on which such a removable transparent thermoplastic film 120 is rewound.

Between the first roller 20 and the second roller 21, the removable transparent thermoplastic film 120 is firstly applied to the lower support structure 110, on the upper surface of which there is the polymerisable resin, and then subsequently driven towards an area in which the polymerisation means 40 are positioned so that the cross-linking process can be carried out through the removable transparent thermoplastic film 120.

Therefore, in the case in which the curing process is carried out through ultraviolet machining, the ultraviolet rays will be released by the polymerisation means 40, will be made to pass through the removable transparent thermoplastic film 120 until the polymerisable resin is reached that, thanks to the radiation received, will solidify.

As can be seen in the figures, the process is carried out through the "roll to roll" technique since the lower support structure 110, which is unrolled from the reel 10, is rewound on a second reel 33 after the application and solidification process of the upper transparent protective coating layer 101 has ended. In the case in which the lower support structure comprised, already on the reel 10, the reflective layer and the other layers necessary to form the reflecting stratiform structure 100 described above, once the structure is rewound on the reel 33, the structure thus obtained can thus be ready to be used. On the other hand, in the case in which the lower support structure did not comprise all of the layers necessary to form the reflecting stratiform structure 100, they will be applied afterwards.

With reference to FIG. 3 a second application method of the upper transparent protective coating layer 101 to the lower support structure 110 will now be described.

As can be seen in the figures, also in this case the lower support structure 110 is unwound, along the direction shown by the arrow in the figures, from a reel 10 on which such a lower support structure 110 is wound.

In this case, however, the lower support structure 110 must be transparent since the cross-linking process, as will be explained in greater detail hereinafter, is carried out through the first transparent thermoplastic film 102.

Also in this case, the lower support structure 110 will be conveyed through one or more pairs of rollers 30 towards an element for the application of the polymerisable resin 50 which also in this case allows a polymerisable resin to be spread on the first thermoplastic film 102.

Thereafter, the lower support structure 110, on which the polymerisable resin has been applied, is driven through rollers towards an area in which the polymerisation means 40 are present, which, similarly to those described with reference to FIG. 2, make it possible for example to emit an electron beam or ultraviolet rays so as to cross-link the polymerisable resin passing through the first transparent thermoplastic film 102.

In this particular embodiment, at the polymerisation means 40 a drum 60, preferably rotatable, is also positioned, which makes it possible to exert a pressure on the surface of the first transparent thermoplastic film 102 on which the polymerisable resin has been applied.

Thanks to the characteristics of the surface of the rotatable drum it will be possible to form an upper transparent protective coating layer 101 having predetermined surface features. Firstly, if it is wished to have a perfectly smooth upper transparent protective coating layer 101 a rotatable drum having a perfectly smooth outer surface will be used. Alternatively, in the case in which it is wished to have a surface of the upper transparent protective coating layer 101 having a predetermined pattern, a rotatable drum having a predetermined pattern will be used so as to replicate the surface features of the drum 60 on the upper transparent protective coating layer 101.

Due to what has been described above, the polymerisation means 40, in the particular case for example in which an electron beam machining is carried out, will emit an electron beam that will pass firstly through the lower surface of the first transparent thermoplastic film 102, will then pass through it and will strike the polymerisable resin that in this way can solidify. An analogous process will be used in the case in which alternatively ultraviolet machining is used.

As can be seen in the figures, also in this case the stratiform structure thus obtained will be rewound on a reel 33. However, in this embodiment, after the rewinding on the reel 33, at least the reflective layer 103 must be applied to the final structure so as to form a reflecting stratiform structure 100 which allows the incident radiation to be reflected since, as stated, the lower support layer 110 is in this particular embodiment completely transparent.

Due to what has been described above, it is clear that, both in the process described in FIG. 2 and in the process described in FIG. 3, the cross-linking process is carried out by making energy pass through a transparent thermoplastic film, such as PET.

Even if the present invention has been described with reference to the embodiments described above, it is clear to those skilled in the art that it is possible to make different modifications, variations and improvements of the present invention in light of the teaching described above and in the attached claims, without departing from the object and from the scope of protection of the invention.

For example, even if the presence of a single transparent thermoplastic film, such as PET, positioned between the transparent protective upper coating layer 101 and the reflective layer 103 has been described, it is possible for the number of layers to be more than one. Moreover, even if not specifically described, it is clear that such a reflecting stratiform structure 100 can be applied in various fields, like for example construction. Indeed, such a structure 100 can be applied for example on the surfaces of buildings to allow incident light to be reflected and thus have better heat insulation.

Finally, fields that are deemed known by those skilled in the art have not been described in order to avoid needlessly excessively overshadowing the invention described.

Consequently, the invention is not limited to the embodiments described above, but is only limited by the scope of protection of the attached claims.

What is claimed is:

1. Method for making a reflecting stratiform structure, configured so as to reflect the incident radiation coming from an upper side with respect to said structure, comprising an upper transparent protective coating layer, wherein said upper transparent protective coating layer is applied to said reflecting stratiform structure through a cross-linking process, which is carried out by cross-linking a polymerisable resin, which will form said upper transparent protective coating layer, by passing energy through a transparent thermoplastic film, so as to cross-link said polymerisable resin, wherein said method comprises the following steps:
   a. providing a lower support structure of said reflecting stratiform structure on which to apply said upper transparent protective coating layer;
   b. applying said polymerisable resin on said lower support structure;
   c. applying a removable transparent thermoplastic film on said polymerisable resin;
   d. cross-linking said polymerisable resin through said removable transparent thermoplastic film so as to solidify said polymerisable resin forming said upper transparent protective coating layer; and
   e. withdrawing said removable transparent thermoplastic film from said upper transparent protective coating layer.

2. Method according to claim 1, wherein said cross-linking process is carried out either through electron beam machining or through ultraviolet machining.

3. Method according to claim 1, wherein said polymerisable resin that will form said upper transparent protective coating layer is applied directly on the transparent thermoplastic film.

4. Method according to claim 1, wherein said steps c. and e. are carried out through a "roll to roll" process.

5. Method according to claim 1, wherein said lower support structure is a transparent thermoplastic film, wherein said method further comprises the following steps:
   f. applying a pressure directly on said polymerisable resin;
   g. cross-linking said polymerisable resin through said lower support structure so as to solidify said polymerisable resin forming said upper transparent protective coating layer.

6. Method according to claim 5, wherein said step f. is carried out by exerting a pressure through a rotatable drum.

7. Method according to claim 6, wherein surface features of said upper transparent protective coating layer are provided by a surface of said rotatable drum in direct contact with said polymerisable resin.

8. Method according to claim 1, wherein said method is carried out through a "roll to roll" process.

9. Method according to claim 1, wherein
the transparent thermoplastic film comprises polyethylene terephthalate (PET).

10. Method according to claim 3, wherein
the transparent thermoplastic film comprises polyethylene terephthalate (PET).

11. Method according to claim 2, wherein
the transparent thermoplastic film comprises polyethylene terephthalate (PET).

12. Method according to claim 5, wherein
the transparent thermoplastic film comprises polyethylene terephthalate (PET).

13. A method of making a reflecting stratiform structure having a reflective layer with a transparent protective coating layer comprising the steps of:
providing a support structure;
applying a reflective layer to the support structure;
applying a polymerisable resin to the support structure;
contacting the polymerisable resin with a transparent film;
cross-linking the polymerisable resin with energy passing through the transparent film, wherein the polymerisable resin forms a transparent protective coating layer on a surface of the reflecting stratiform structure;
removing the transparent film after said step of cross-linking the polymerisable resin; and
wherein the reflective layer is applied to the support structure prior to said step of applying the polymerisable resin.

14. A method of making a reflecting stratiform structure having a reflective layer with a transparent protective coating layer comprising the steps of:
providing a support structure;
applying a reflective layer to the support structure;
applying a polymerisable resin to the su port structure;
contacting the polymerisable resin with a transparent film;
cross-linking the polymerisable resin with energy passing through the transparent film, wherein the polymerisable resin forms a transparent protective coating layer on a surface of the reflecting stratiform structure;
wherein the support structure is transparent; and
the reflective layer is applied to the support structure after said step of cross-linking the polymerisable resin.

* * * * *